United States Patent
Chan et al.

(10) Patent No.: US 8,812,289 B1
(45) Date of Patent: Aug. 19, 2014

(54) SIMULATION THAT TRANSFERS PORT VALUES OF A DESIGN BLOCK VIA A CONFIGURATION BLOCK OF A PROGRAMMABLE DEVICE

(75) Inventors: Chi Bun Chan, San Jose, CA (US); Jonathan B. Ballagh, Boulder, CO (US); Nabeel Shirazi, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 2223 days.

(21) Appl. No.: 11/732,642

(22) Filed: Apr. 4, 2007

(51) Int. Cl.
| | |
|---|---|
| G06F 9/455 | (2006.01) |
| G06F 17/50 | (2006.01) |
| G06F 11/36 | (2006.01) |
| G06F 17/22 | (2006.01) |
| G06F 11/267 | (2006.01) |

(52) U.S. Cl.
CPC .......... *G06F 17/5027* (2013.01); *G06F 9/455* (2013.01); *G06F 11/3652* (2013.01); *G06F 17/22* (2013.01); *G06F 2217/86* (2013.01); *G06F 11/267* (2013.01); *G06F 17/5009* (2013.01)
USPC .............................. 703/28; 703/14

(58) Field of Classification Search
CPC .......... G06F 17/5009; G06F 17/5022; G06F 17/5027; G06F 2217/86; G06F 9/455; G06F 11/3652; G06F 11/267
USPC ........................................... 703/14, 28
See application file for complete search history.

(56) References Cited

U.S. PATENT DOCUMENTS

2004/0260528 A1* 12/2004 Ballagh et al. ................. 703/14

* cited by examiner

*Primary Examiner* — Kamini S Shah
*Assistant Examiner* — Luke Osborne
(74) *Attorney, Agent, or Firm* — LeRoy D. Maunu; Lois D. Cartier (57) ABSTRACT

Approaches for simulating an electronic system. In one approach, a software co-simulation platform is configured to produce a first time sequence of values of a plurality of input ports of a design block of the electronic system, consume a second time sequence of values of a plurality of output ports of the design block, and generate access transactions for transferring the first and second sequences of values. The software co-simulation platform generates a plurality of reconfiguration transactions for transferring reconfiguration data for the design block. A PLD is configured to implement a communication block and a control block. The communication block receives the reconfiguration and access transactions from the software co-simulation platform, and the control block reconfigures programmable logic and interconnect resources of the PLD in response to the reconfiguration transactions. The control block also controls the emulation of the design block in response to the access transactions.

20 Claims, 5 Drawing Sheets

SIMULATION THAT TRANSFERS PORT VALUES OF A DESIGN BLOCK VIA A CONFIGURATION BLOCK OF A PROGRAMMABLE DEVICE

FIELD OF THE INVENTION

The present invention generally relates to simulation of an electronic system and more particularly to co-simulation of an electronic system in software and hardware.

BACKGROUND

A designer may assemble and simulate an electronic system in a high-level modeling system (HLMS), such as System Generator for DSP which is available from Xilinx, Inc. The electronic system may be simulated in the HLMS using software algorithms that model the behavior of the design blocks that comprise the electronic system. A simulation of the electronic system in the HLMS may separate the electronic system into parts that are each simulated on different simulation platforms. Co-simulation is a simulation of an electronic system that combines the separate simulations of certain parts of the electronic system on respective simulation platforms. For example, a co-simulation may emulate the behavior of one design block of the electronic system on a hardware co-simulation platform while the remainder of the electronic system is simulated on a software co-simulation platform, such as a general purpose computer. Using a hardware co-simulation platform to emulate a portion of an electronic system may dramatically accelerate the speed of simulating the entire electronic system.

For co-simulation of a design block on a hardware co-simulation platform, a software co-simulation platform may write stimuli to the input ports of the design block on the hardware co-simulation platform and read captured results from the output ports of the design block. System Generator for DSP may automatically generate an emulator for a selected design block together with a communication interface needed to transfer stimuli and results between software and hardware co-simulation platforms. During simulation of the electronic system, System Generator for DSP may also coordinate the operation of the software and hardware co-simulation platforms, including controlling the enabling and disabling of the clocking of the design block on the hardware co-simulation platform.

The communication interface between the software co-simulation platform and an arbitrary design block implemented on the hardware co-simulation platform may include a memory map that provides an interface to access the input and output ports of the design block. Each input and output port may be assigned a respective address in the memory map, and stimuli may be applied to the design block by writing input values to the appropriate addresses in the memory map and results may be obtained from the design block be reading output values from the appropriate addresses in the memory map. Thus, a software co-simulation platform may interact with a design block emulated on a hardware co-simulation platform by performing write and read operations to addresses in the address map.

A memory map may be implemented using multiplexers and address decoding logic. An excessive amount of resources may be required to implement the memory map. A large memory map may include long combinational logic paths and large fanouts for multiplexer select signals that limit the operating frequency of the emulation of the design block. In addition, because the address decoding logic is tied to the physical locations of the input and output ports of the design block in the hardware co-simulation platform, an excessive amount of interconnect resources may be required to connect the memory map to the ports of the design block.

The present invention may address one or more of the above issues.

SUMMARY OF THE INVENTION

In one embodiment, a co-simulation system is provided for simulating an electronic system. The co-simulation system includes a software co-simulation platform and a programmable logic device (PLD) coupled to the software co-simulation platform. The software co-simulation platform is configured to produce a first time sequence of values of a plurality of input ports of a design block of the electronic system, consume a second time sequence of values of a plurality of output ports of the design block, and generate access transactions for transferring the first and second sequences of values. The software co-simulation platform also generates a plurality of reconfiguration transactions for transferring reconfiguration data for the design block. The PLD is configured to implement a communication block and a control block, and the communication block is configured to receive the reconfiguration and access transactions from the software co-simulation platform. The control block is configured to reconfigure the programmable logic and interconnect resources of the PLD via the internal configuration block of the PLD to implement an emulation of the design block in response to the reconfiguration transactions. The control block is further configured to control the emulation of the design block in response to the access transactions. The control includes transmitting the first sequence of values to the emulation of the input ports of the design block via the internal configuration block and receiving the second sequence of values from the emulation of the output ports of the design block via the internal configuration block.

In another embodiment, a program storage medium is provided. The program storage medium includes a processor-readable device that is configured with instructions that are executable by at least one processor. Execution of the instructions causes the processor to implement a software co-simulation platform that performs operations including configuring a programmable logic device (PLD), with a a communication block and a control block. The communication block receives from the software co-simulation platform, a plurality of reconfiguration transactions and a plurality of access transactions. Each reconfiguration transaction includes one of a plurality of reconfiguration addresses in a memory map. The memory map includes a plurality of access addresses for a plurality of ports of a design block, and each access transaction includes one of the access addresses in the memory map. The plurality of ports of the design block include a plurality of input ports. The control block reconfigures the programmable logic and interconnect resources of the PLD to implement an emulation of the design block in response to the reconfiguration transactions, and also controls the emulation of the design block in response to the access transactions. The control includes supplying a time sequence of values from the access registers in the memory map to the emulation of the input ports of the design block via the internal configuration block.

Yet another embodiment provides a method for co-simulation of an electronic system. The method includes configuring a programmable logic device (PLD) to implement a communication block and a control block. The communication block receives a plurality of reconfiguration transactions and a plurality of access transactions from a software co-simulation platform. Reconfiguration transactions are generated by the software co-simulation platform, and the control block, in response to the reconfiguration transactions, reconfigures the programmable logic and interconnect resources of the PLD via the PLD's internal configuration block to implement an emulation of a design block of the electronic system. The software co-simulation platform produces a first time sequence of values of a plurality of input ports of the design block of the electronic system. The software co-simulation platform consumes a second time sequence of values of a plurality of output ports of the design block. The emulation of the design block generates the second time sequence of values of the output ports from the first time sequence of values of the input ports. The software co-simulation platform generates the access transactions for transferring the first and second sequences of values, and the control block controls the emulation of the design block in response to the access transactions. The control includes transmitting the first sequence of values to the emulation of the input ports of the design block via the internal configuration block and receiving the second sequence of values from the emulation of the output ports of the design block via the internal configuration block.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
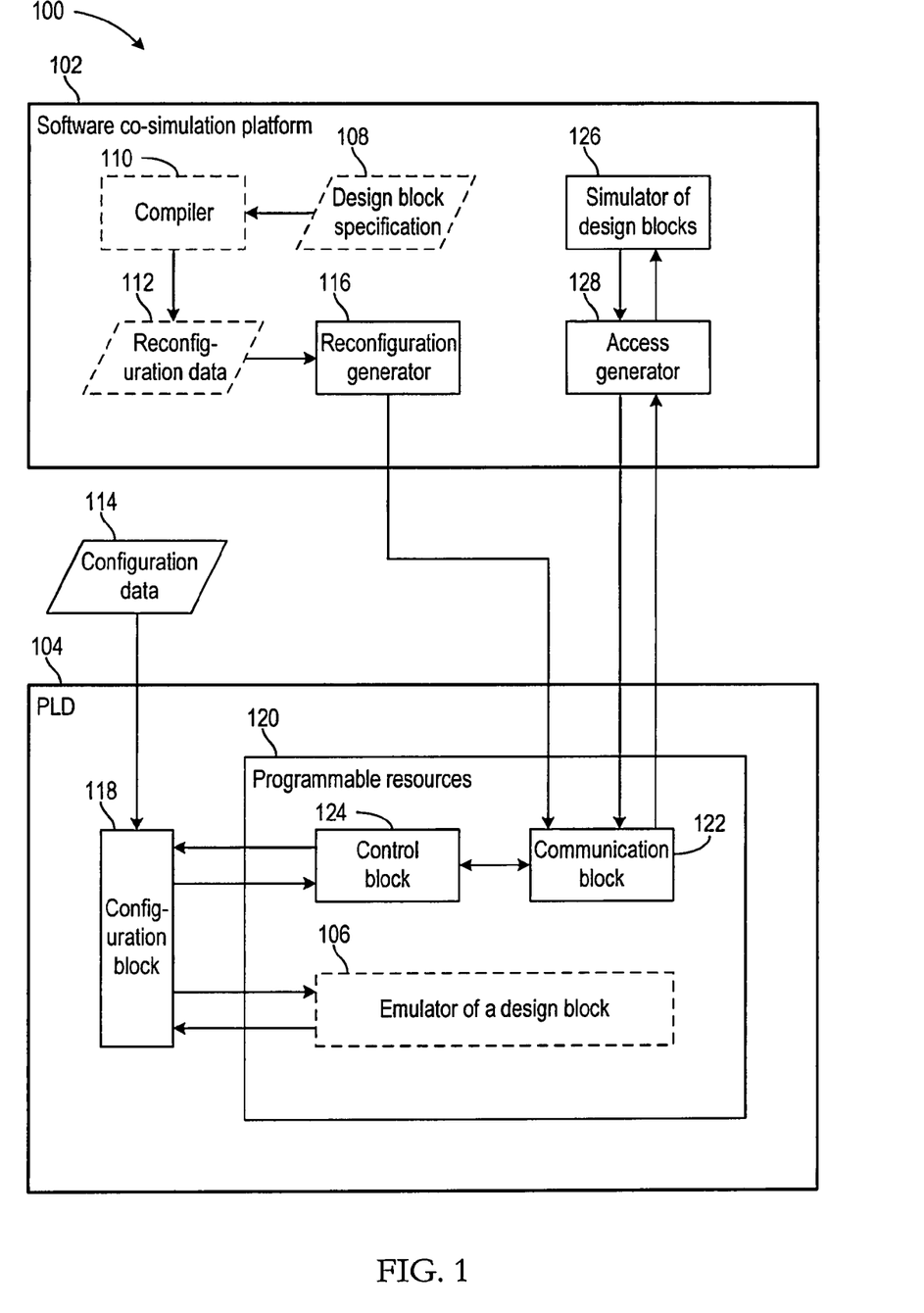
FIG. 1 is a block diagram of a co-simulation system in accordance with various embodiments of the invention.

FIG. 1 is a block diagram of a co-simulation system 100 in accordance with various embodiments of the invention. The co-simulation system 100 includes a software co-simulation platform 102 and a hardware co-simulation platform that is a programmable logic device (PLD) 104. The software co-simulation platform 102 may be used to simulate certain of the blocks of an electronic system, and the PLD 104 may be used to emulate the other blocks of the electronic system. Simulation of a block in hardware may be denoted emulation of the block. The emulator 106 of a design block is shown with a dotted outline because emulator 106 may be created in PLD 104 after the initial configuration of the PLD. The design block specification 108, the compiler 110, and the reconfiguration data 112 are shown with a dotted outline because the software co-simulation platform 102 may optionally include the compiler 110 for generating the reconfiguration data 112 from the design block specification 108.

At power-up of the PLD 104, the PLD may be configured with configuration data 114 via the configuration block 118 of PLD 104. In one embodiment, the configuration data 114 is automatically provided at power-up of the PLD 104 by a non-volatile memory that is either external or internal to the PLD. In another embodiment, the software co-simulation platform 102 may provide the configuration data 114 to the PLD 104.

The configuration block 118 may use the configuration data 114 to configure the programmable logic and interconnect resources 120 to implement a communication block 122 and a control block 124. The configuration block 118 may be a fixed functional block of the PLD 104 that is accessible from the programmable resources 120. For example, the Internal Configuration Access Port (ICAP) of certain PLDs, such as field programmable gate arrays available from Xilinx, Inc., may permit logic functions within the programmable resources of the PLD to read and write the configuration memory of the programmable resources, thereby permitting modification of the existing logic functions within the programmable resources and/or creation of new logic functions within the programmable resources.

In various embodiments of the invention, the configuration data 114 does not include any data to configure the programmable resources 120 to implement the emulation 106 of the design block. In contrast, existing systems for software and hardware co-simulation may require configuration data that includes data for implementing an emulation of the design block. Thus, existing systems for software and hardware co-simulation may require regeneration of the configuration data for each design block and for each modification of a particular design block. In various embodiments of the invention, the configuration data 114 may be fixed for a particular hardware co-simulation platform, such as PLD 104. Having a fixed configuration data 114 may reduce the complexity of the co-simulation system 100 and may also reduce the time needed to initialize the co-simulation system 100.

After the PLD 104 is initialized with the configuration data 114, a reconfiguration generator 116 of the software co-simulation platform 102 may modify the configuration of the PLD 104. The reconfiguration generator 116 may send reconfiguration data to the communication block 122 already implemented in the programmable resources 120 of the PLD 104. The control block 124 may use the reconfiguration data received from communication block 122 to reconfigure the programmable resources 120 via internal access to the configuration block 118 of the PLD 104. The control block 124 may reconfigure the programmable resources 120 to implement the emulation 106 of the design block. A portion of the programmable resources 120, which is not already reserved to implement the communication block 122 and the control block 124, may be used to implement the emulation 106 of the design block.

The PLD 104 is ready to emulate the design block after the PLD is configured with the configuration data 114 to implement the communication block 122 and the control block 124, and after the PLD is reconfigured by the reconfiguration generator 116 to also implement the emulation 106 of the design block. An electronic system simulated by the co-simulation system 100 may have one design block designated for emulation by emulator 106 on the hardware co-simulation platform of PLD 104 while the remainder of the design blocks are designated for simulation by simulator 126 of the software co-simulation platform 102.

During the emulation of the design block by the emulator 106, the emulator 106 may produce a time sequence of values for the design block at one or more outputs of the emulator 106. Certain of these values produced at the outputs of the emulator 106 may be consumed at the inputs the one or more blocks that are simulated by simulator 126. Similarly, a time sequence of values may be produced by the one or more blocks that are simulated by simulator 126, and certain of these values may be consumed by emulator 106. The access generator 128 may transfer values of inputs and outputs between the simulator 126 and the emulator 106. The access generator may transfer values from the outputs of the blocks that are simulated by simulator 126 to the inputs of the blocks emulated by emulator 106, and may also transfer values from the outputs of the blocks emulated by emulator 106 to the inputs of the blocks that are simulated by simulator 126.

The access generator 128 may issue write transactions to transfer a time sequence of values from the simulator 126 to the emulator 106. The control block 124 may receive the values from the access generator 128 via the communication block 122, and the control block 124 may transmit these values to the emulator 106 via the configuration block 118. Similarly, the access generator 128 may issue read transactions to transfer a time sequence of values from the emulator 106 to the simulator 126 via the configuration block 118, the control block 124, and the communication block 122.

In certain embodiments of the invention, the software co-simulation platform 102 may include a compiler 110 for generating reconfiguration data 112 from a specification 108 of the design block. In other embodiments of the invention, the reconfiguration data may be externally generated. The design block may be specified in a hardware description language by the specification 108. The compiler 110 may include a synthesizer for translating the specification 108 into a collection of interconnected basic elements, a mapper for assigning the basic elements to primitives of programmable resources 120, a placer for assigning each primitive to a specific instance of the primitive in the programmable logic resources of programmable resources 120, and a router for appropriately connecting the primitive instances using the programmable interconnect resources of the programmable resource 120.

Figure 2:
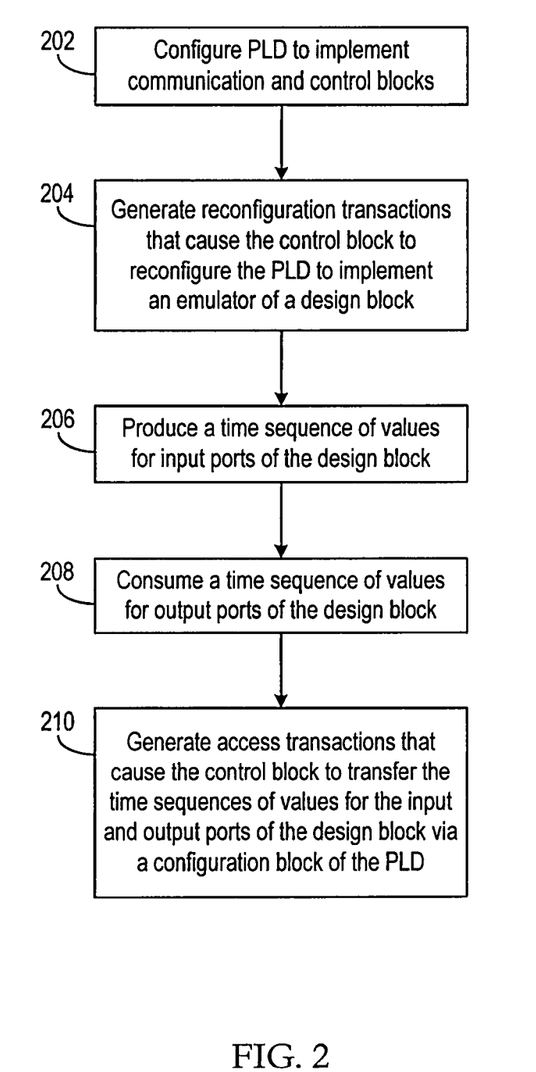
FIG. 2 is a flow diagram of a process for managing the emulation of a design block of an electronic system on a programmable logic device in accordance with various embodiments of the invention.

FIG. 2 is a flow diagram of a process for managing the emulation of a design block of an electronic system on a PLD in accordance with various embodiments of the invention. The PLD is first configured with communication and control blocks for managing an emulator of the design block, and then the PLD is reconfigured to implement the emulator of the design block.

At step 202, the PLD is configured with configuration data that implements a communication block and a control block in the programmable resources of the PLD. At step 204, reconfiguration transactions are generated that cause the control block to reconfigure the PLD to implement the emulator of the design block. Generally, the communication and control blocks are preserved in the programmable resources of the PLD during the reconfiguration to implement the emulator of the design block. In one embodiment, a portion of the programmable logic and routing resources of the PLD are reserved for implementing the communication and control blocks, and the remaining programmable resources are available for reconfiguration by the reconfiguration transactions from a software co-simulation platform.

At step 206, a time sequence of values is produced for the input ports of the design block of the electronic system. In one embodiment, all blocks except for the design block of an electronic system are simulated in software on a software co-simulation platform, and the time sequence of values is produced at the outputs of certain of the blocks of the software simulation. At step 208, another time sequence of values is consumed for the output ports of the design block of the electronic system. In one embodiment, the time sequence of values of step 208 may be produced at the outputs of the emulator for the design block and consumed at the inputs of certain of the blocks of the software simulation.

At step 210, access transactions are generated that cause the control block to transfer both time sequences of values for the input and output ports of the design block. In one embodiment, the access transactions transfer both time sequences of values between a software co-simulation platform and the communication block, and the control block transfers both time sequences of values between the communication block and the emulator of the design block via a configuration block of the PLD.

Figure 3:
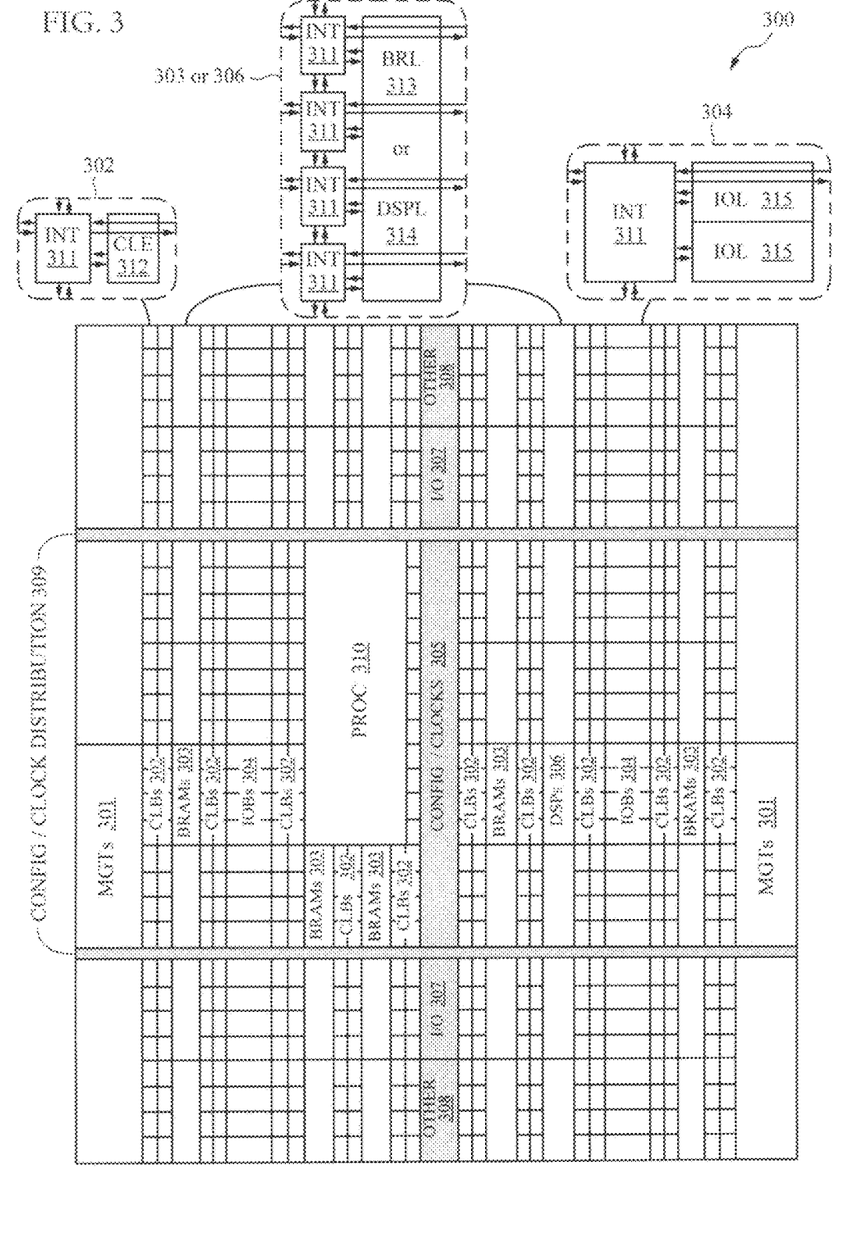
FIG. 3 is a block diagram of a programmable logic device that may be configured and reconfigured to emulate a design block in accordance with various embodiments of the invention.

FIG. 3 is a block diagram of a PLD that may be configured and reconfigured to emulate a design block in accordance with various embodiments of the invention. Certain PLDs, such as advanced field programmable gate arrays (FPGAs) can include several different types of programmable logic blocks in the array. FIG. 3 illustrates an example FPGA architecture 300 that includes a large number of different programmable tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307) (e.g., configuration ports and clock ports), and other programmable logic 308 such as digital clock managers, analog-to-digital converters, system monitoring logic, and so forth. Some FPGAs also include dedicated processor blocks (PROC 310).

In some FPGAs, each programmable tile includes a programmable interconnect element (INT 311) having standardized connections to and from a corresponding interconnect element in each adjacent tile. Therefore, the programmable interconnect elements taken together implement the programmable interconnect structure for the illustrated FPGA. The programmable interconnect element (INT 311) also includes the connections to and from the programmable logic element within the same tile, as shown by the examples included at the top of FIG. 3.

For example, a CLB 302 can include a configurable logic element (CLE 312) that can be programmed to implement user logic plus a single programmable interconnect element (INT 311). A BRAM 303 can include a BRAM logic element (BRL 313) in addition to one or more programmable interconnect elements. Frequently, the number of interconnect elements included in a tile depends on the height of the tile. In the pictured embodiment, a BRAM tile has the same height as four CLBs, but other numbers (e.g., five) can also be used. A DSP tile 306 can include a DSP logic element (DSPL 314) in addition to an appropriate number of programmable interconnect elements. An IOB 304 can include, for example, two instances of an input/output logic element (IOL 315) in addition to one instance of the programmable interconnect element (INT 311). As will be clear to those of skill in the art, the actual I/O pads connected, for example, to the I/O logic element 315 are manufactured using metal layered above the various illustrated logic blocks, and typically are not confined to the area of the input/output logic element 315.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic.

Figure 4:
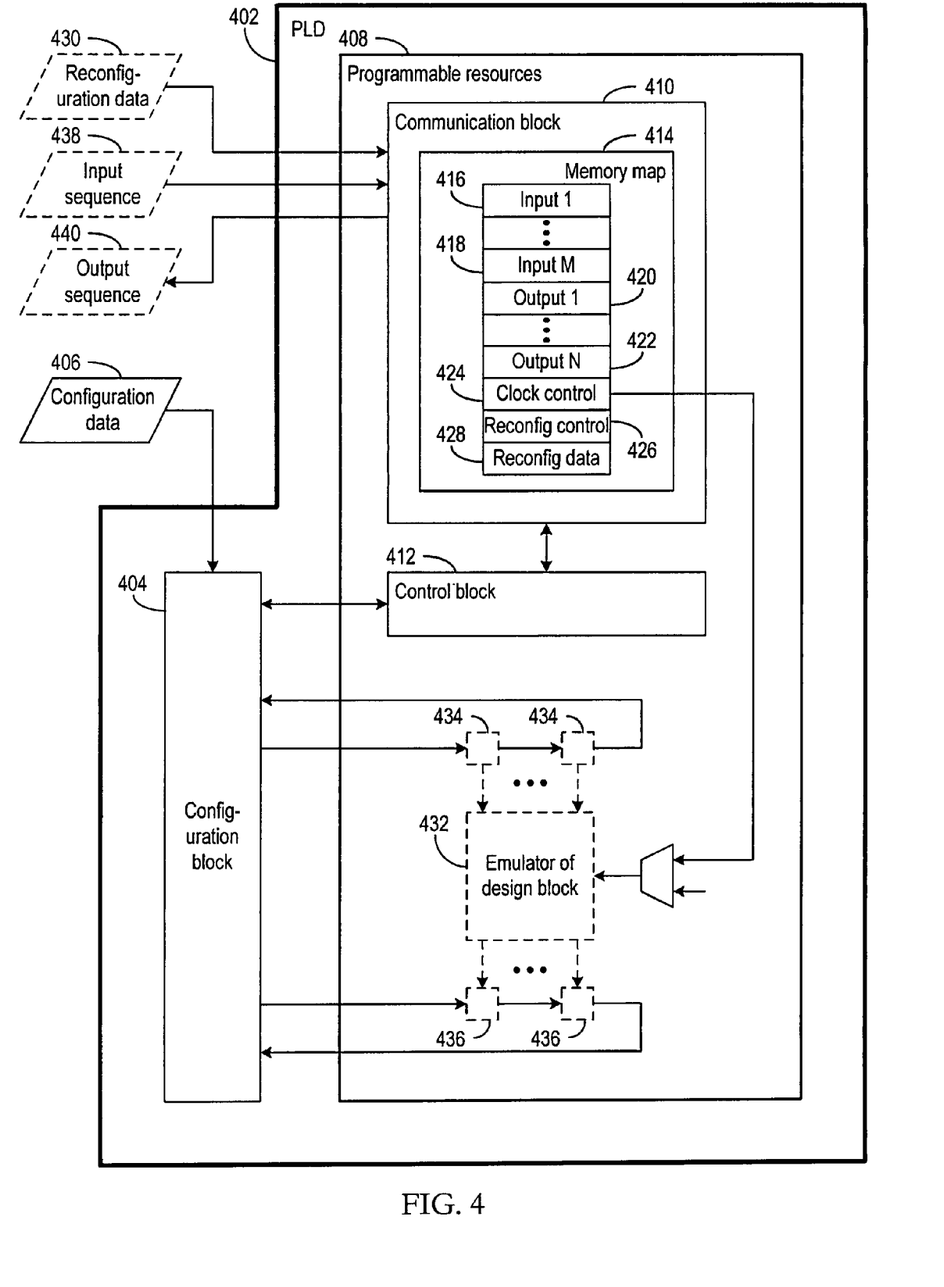
FIG. 4 is a block diagram illustrating a programmable logic device for emulating a design block in accordance with various embodiments of the invention.

FIG. 4 is a block diagram illustrating a PLD 402 for emulating a design block in accordance with various embodiments of the invention. During emulation of the design block, the values of the input ports of the design block may be transferred to the PLD 402 via the configuration block 404, and the values of the output ports of the design block may also be transferred from the PLD 402 via the configuration block 404.

At power-up or reset of PLD 402, configuration block 404 may configure the programmable logic and interconnect resources 408 of PLD 402 with configuration data 406. The blocks with a solid outline in FIG. 4 may be used or created during this initial configuration of PLD 402, while the blocks with a dotted outline may be used or created after this initial configuration of PLD 402. The configuration data 406 may implement a communication block 410 and a control block 412 in a portion of the programmable resources 408. The configuration data 406 may provide data to initialize all of the configuration memory within the programmable resources 408, or the configuration data 406 may specify the initialization of specific frames of the configuration memory within the programmable resources. The values of configuration memory determine the function of the programmable logic and interconnect resources 408 in the PLD 402. Generally, a portion of the programmable resources 408 remains unutilized even when the configuration data 406 initializes all of the configuration memory within programmable resources 408.

After the programmable resources 408 are configured to implement the communication block 410 and the control block 412, these blocks may provide the capability to reconfigure the programmable logic and interconnect resources 408. The communication block 410 may include a memory map 414 that includes storage locations 416 through 428, including reconfiguration control location 426 and reconfiguration data location 428. Reconfiguration data 430 may be written to location 428 in the memory map 414 during the reconfiguration of programmable resources 408. In an alternative embodiment, the reconfiguration data 430 may be provided from a process running on an embedded processor within the PLD. This may conserve bandwidth between the software co-simulation platform 102 and the PLD performing the hardware co-simulation. For example, the reconfiguration commands may be considerably longer than the traditional co-simulation commands to read and write registers. The embedded processor may received the traditional co-simulation commands and generate the reconfiguration data on-the-fly inside the PLD.

In one embodiment of the invention, the control block 412 communicates with the configuration block 404 using the SelectMAP protocol of the internal configuration access port (ICAP) that is available in FPGAs from Xilinx, Inc. ICAP may include the inputs /ENABLE for enabling write and read access, /WRITE for determining whether an enabled access is a read or a write, CCLK for clocking the configuration access, and DI[7:0] for supplying data to the configuration block 404. ICAP may also include the outputs BUSY for indicating a configuration access is currently in progress and DO[7:0] for returning data from the configuration block 404. The /ENABLE, /WRITE, and CCLK inputs and the BUSY output may be connected to respective bits of the reconfiguration control location 426 in the memory map 414 and the DI[7:0] inputs and DO[7:0] outputs may be connected to respective portions of the reconfiguration data location 428.

To supply a byte of the reconfiguration data 430 to the configuration block 404, a write to the reconfiguration control location 426 may set /ENABLE and /WRITE for a write access, a write to the reconfiguration data location 428 may supply the byte of the reconfiguration data 430, and another write to the reconfiguration control location 426 may create a rising edge on CCLK and transfer the byte to the configuration block 404. To verify the transfer of the byte of the reconfiguration data 430, the reconfiguration control location 426 may be read until BUSY indicates completion of the transfer. Thus, a series of read and write transactions to the memory map 414 in the communication block 410 may be used to perform any SelectMAP configuration access to the configuration block 404, including reconfiguring the programmable resources 408 with reconfiguration data 430 that creates an emulator 432 of a design block.

It will be appreciated that the control block 412 may include functions for higher-level control of the control of the configuration block 404. For example, a single multi-byte write transaction targeting the reconfiguration data location 428 in the memory map 414 may cause the control block 412 to set up /ENABLE and /WRITE and toggle CCLK several times while monitoring BUSY to transfer multiple bytes of data from reconfiguration data location 428 to DI[7:0] of an ICAP interface of the configuration block 404.

The reconfiguration of the programmable resources 408 of PLD 402 may create an emulator 432 of a design block along with input registers 434 connected to the inputs of the emulator 432 and output registers 436 connected to the outputs of the emulator 432. During emulation of the design block by emulator 432, the values in the input and output registers 434 and 436 may be accessible by the configuration block 404. Thus, the values of the inputs of the design block from the input sequence 438 for a particular time step may first be written to locations 416 through 418 in the memory map 414, and then the control block 412 may control the configuration block 404 to perform the appropriate configuration accesses to transfer the input values from the locations 416 through 418 to the input registers 434 of the emulator 432. In one embodiment, certain transactions to the clock control location 424 may enable a single step of a clock of the emulator 432, such that the output registers 436 are updated with the outputs of the emulator 432 for the particular time step. The control block 412 may use the configuration block 404 to transfer the values of the outputs of the design block for the particular time step from the output registers 436 to the locations 420 through 422 in the memory map 414, and the appropriate read transactions may transfer the output values of the design block from the location 420 through 422 to the output sequence 440.

An advantage of various embodiments of the invention is that the same mechanism may be used for reconfiguring the programmable resources 408 and for transferring the values of the inputs and outputs of the design block for each step of the simulation time sequence. In contrast, existing systems for software and hardware co-simulation may have additional complexity from utilizing separate mechanisms for configuring the PLD and for transferring the time sequences of values for the inputs and output of the design block. The communication block 410 may have a memory map 414 that includes locations 426 and 428 for reconfiguring the programmable resources 408, and the memory map 414 may also include locations 416 through 422 for accessing the values of the inputs and outputs of the design block. Reconfiguration transactions may be distinguished from access transactions because reconfiguration transactions may include an address that selects one of the locations 426 and 428 in the memory map 414, while access transactions may include an address that selects one of the locations 416 through 422 in the memory map.

In certain other embodiments of the invention, the locations 416 through 422 may be omitted from the memory map 414. For each time step of the simulation, the values of the inputs of the design block may be transferred from the input sequence 438 to the registers 434 by an appropriate sequence of transactions to the reconfiguration locations 426 and 428 in the memory map 414. For example, the control block 412 may control the configuration block 404 to perform every possible configuration access to the programmable resources 408 in response to the appropriate write and read transactions to the reconfiguration locations 426 and 428 of the memory map 414. Software of a software co-simulation platform may generate the transactions that write the input sequence 438 to the input registers 434 and read the output sequence 440 from the output registers 436.

To provide efficient configuration access, the registers 434 and 436 may be assigned to specific programmable logic resources in the PLD 402. For example, the configuration memory of the FPGA of FIG. 3 may be organized in frames, with each frame configuring the programmable resources in one of the columns of the MGTs 201, CLBs 202, BRAMs 203, IOBs 204 and DSP 206, and efficient configuration access may be provided by limiting the number of frames that are accessed. The registers 434 and 436 may be assigned to programmable logic resources such that registers 434 may be accessed using one frame of configuration memory and registers 436 may be accessed using another frame of configuration memory. For each time step of the simulation, the values for the time step can be transferred from the input sequence 438 to the input registers 434 using a single configuration access to the corresponding frame of configuration memory. A single configuration access may similarly be used to transfer the values for a time step from the output registers 436 to the output sequence 440.

Because PLDs generally include mechanisms for configuring the programmable logic and interconnect resources, the multiplexers and address decoding logic required to implement memory map 414 may be reduced or eliminated in comparison with existing techniques for software and hardware co-simulation. Consequently, any long combination logic paths and large fanouts for multiplexer select signals may be reduced, such that the memory map 414 does not constrain the operating frequency of the emulator 432 of the design block. In addition, because input and output registers 434 and 436 are accessed using the configuration mechanism instead of using programmable interconnect resources as in existing techniques for software and hardware co-simulation, the required programmable interconnect resources may be reduced.

Figure 5:
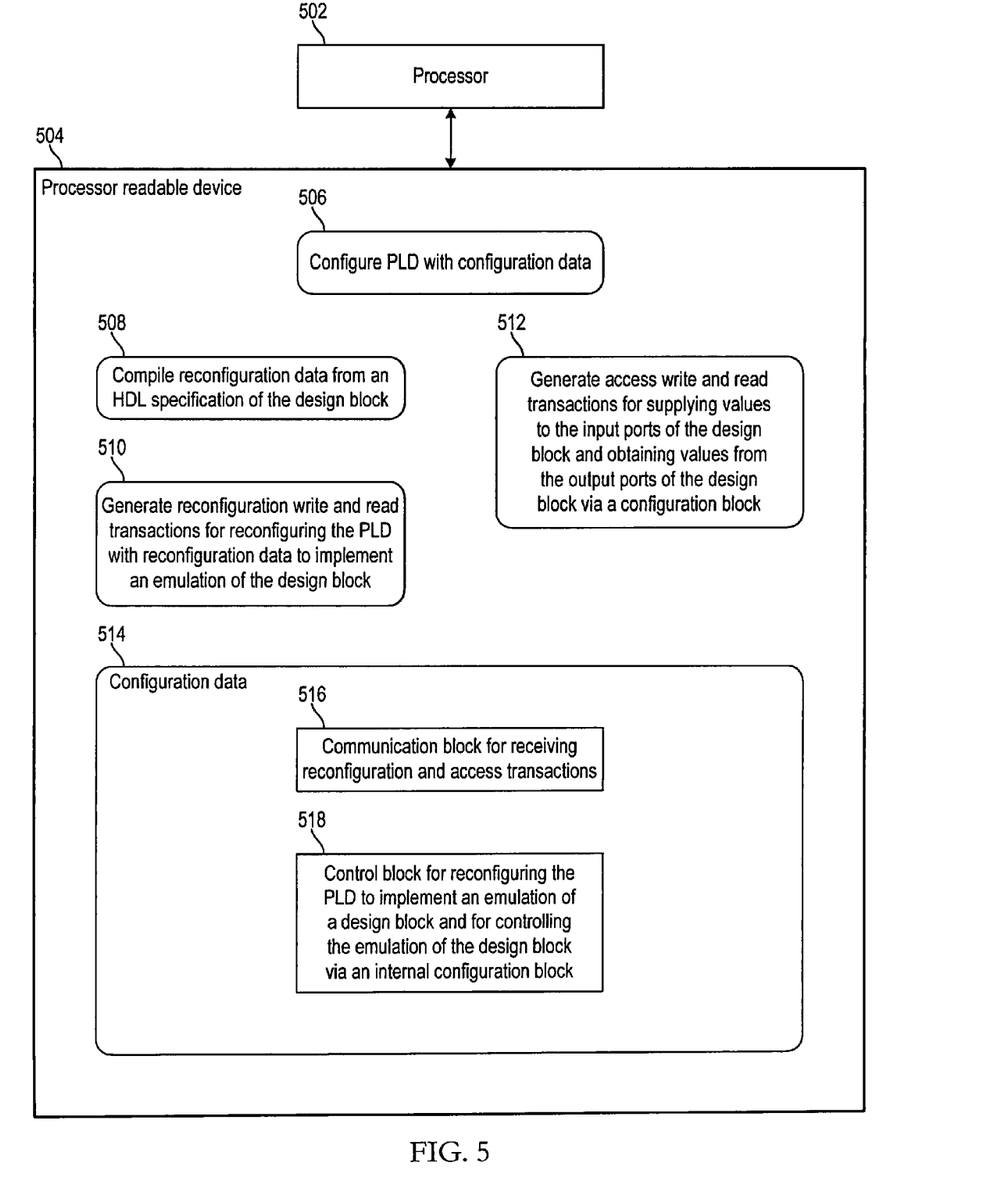
FIG. 5 is a block diagram of a software co-simulation platform for simulating an electronic system in accordance with various embodiments of the invention.

FIG. 5 is a block diagram of a software co-simulation platform for simulating an electronic system in accordance with various embodiments of the invention. A processor 502 executes instructions from a processor-readable device 504, and execution of the instructions by processor 502 causes processor 502 to implement a software co-simulation platform.

In certain embodiments of the invention, execution of the instructions from module 506 causes processor 502 to configure a PLD with configuration data using an internal configuration block for configuring an array of programmable logic and interconnect resources of the PLD. In certain embodiments of the invention, execution of the instructions from module 508 causes processor 502 to compile reconfiguration data from a specification of a design block of the electronic system. Execution of the instructions from module 510 causes processor 502 to generate reconfiguration write and/or read transactions that reconfigure the PLD with the reconfiguration data, with the PLD reconfigured to implement an emulation of the design block. During simulation of the electronic system, execution of the instructions from module 512 causes processor 502 to generate access write and read transactions for accessing the input and output ports of the emulation of the design block via the internal configuration block. The access transactions supply values to the input ports of the emulation of the design block and obtain values from the output ports of the emulation of the design block.

In certain embodiments of the invention, the processor readable device 504 may also include configuration data 514 for configuring the PLD on power-up or reset. The configuration data 514 may include data 516 for implementing a communication block in the programmable logic and interconnect resources of the PLD and data 518 for implementing a control block in the programmable logic and interconnect resources of the PLD.

The communication block receives reconfiguration transactions and access transactions from the software co-simulation platform, and each reconfiguration and access transaction respectively includes a reconfiguration and access address of a memory map.

The control block is coupled to the communication block and the internal configuration block of the PLD. The control block reconfigures the programmable resources to implement an emulation of the design block in response to the reconfiguration transactions. The control block controls the emulation of the design block in response to the access transactions, including supplying a time sequence of values from the access addresses in the memory map to the emulation of the input ports of the design block via the internal configuration block.

What is claimed is:

1. A co-simulation system for simulating an electronic system, comprising:
   a software co-simulation platform configured to produce a first time sequence of values of a plurality of input ports of a design block of the electronic system, consume a second time sequence of values of a plurality of output ports of the design block, and generate access transactions for transferring the first and second sequences of values, wherein the software co-simulation platform generates a plurality of reconfiguration transactions for transferring reconfiguration data for the design block; and
   a programmable device coupled to the software co-simulation platform and including an array of programmable logic and interconnect resources and an internal configuration block for configuring and reconfiguring the programmable logic and interconnect resources, the programmable logic and interconnect resources configured to implement a communication block and a control block by configuring the programmable logic and interconnect resources via the internal configuration block with configuration data that does not implement an emulation of the design block, the communication block configured to receive the reconfiguration and access transactions from the software co-simulation platform, the control block configured to reconfigure the programmable logic and interconnect resources via the internal configuration block to implement an emulation of the design block in response to the reconfiguration transactions, the control block further configured, in response to the access transactions, to transmit the first sequence of values to the emulation of the design block via the internal configuration block and receive the second sequence of values from the emulation of the design block via the internal configuration block.

2. The co-simulation system of claim 1, wherein the software co-simulation platform is further configured to compile a specification of the design block in a hardware description language into the reconfiguration data.

3. The co-simulation system of claim 1, wherein the programmable logic and interconnect resources are configured to implement the control block that reconfigures the programmable logic and interconnect resources to implement the emulation of the design block, the reconfiguring including transfer of the reconfiguration data received from the reconfiguration transactions by the communication block to the programmable logic and interconnect resources via the internal configuration block.

4. The co-simulation system of claim 1, wherein the programmable logic and interconnect resources are configured to implement the control block for the reconfiguring of the programmable logic and interconnect resources to implement the emulation of the design block, the emulation of the design block coupling a respective input register to each of the input ports of the design block and a respective output register to each of the output ports of the design block, the control block further configured to transmit each value of the first sequence from a respective at least one of the access transactions to the input registers via the internal configuration block and to receive each value of the second sequence from the output registers to a respective at least one of the access transactions via the internal configuration block.

5. The co-simulation system of claim 4, wherein the software co-simulation platform compiles the reconfiguration data that aggregates the reconfiguration data defining the input and output registers into at least one frame of the reconfiguration data, the at least one frame including a frame defining the registers for the input ports and a frame defining the registers for the output ports, each frame of the reconfiguration data reconfiguring one of a plurality of columns of the array of programmable logic and interconnect resources and each frame of the reconfiguration data accessible by the internal configuration block in a single operation.

6. The co-simulation system of claim 1, wherein the programmable logic and interconnect resources are configured to implement the control block that includes an address map having a plurality of access addresses for the input and output ports of the design block and a plurality of reconfiguration addresses, with each access transaction including one of the access addresses and each reconfiguration transaction including one of the reconfiguration addresses.

7. The co-simulation system of claim 6, wherein the programmable logic and interconnect resources are configured to implement the control block that includes the address map having a respective one of the access addresses for each of the input and output ports of the design block.

8. The co-simulation system of claim 6, wherein the programmable logic and interconnect resources are configured to implement the control block that includes the address map having one of the reconfiguration addresses for control signals of the internal access block and another of the reconfiguration addresses for transferring a portion of the reconfiguration data.

9. The co-simulation system of claim 6, wherein the programmable logic and interconnect resources are configured to implement the control block that includes the address map having one of the reconfiguration addresses for enabling and disabling at least one clock signal of the emulation of the design block.

10. A non-transitory program storage medium, comprising: a processor-readable device configured with instructions, wherein execution of the instructions by at least one processor causes the at least one processor to implement a software co-simulation platform that configures programmable logic and interconnect resources of a programmable device with configuration data, wherein the programmable device includes an internal configuration block, and the configuration data does not implement an emulation of the design block and configures the programmable logic and interconnect resources to implement a communication block and a control block; wherein the communication block is configured to receive from the software co-simulation platform a plurality of reconfiguration transactions and a plurality of access transactions, with each reconfiguration transaction including one of a plurality of reconfiguration addresses, and each access transaction including one of a plurality of access addresses, wherein the design block includes a plurality of input ports and a plurality of output ports, and wherein the control block is coupled to the communication block and the internal configuration block, and the control block is configured to include a memory map having the access addresses for the input and output ports of the design block and the reconfiguration addresses, and the control block is configured to reconfigure the programmable logic and interconnect resources to implement an emulation of the design block in response to the reconfiguration transactions, and control the emulation of the design block in response to the access transactions, the control by the control block including supply of a time sequence of values from the access addresses in the memory map to the emulation of the design block via the internal configuration block.

11. The program storage medium of claim 10, wherein the processor-readable device is further configured with the configuration data.

12. The program storage medium of claim 10, wherein the execution of the instructions by the at least one processor causes the at least one processor to implement the software co-simulation platform that generates the reconfiguration transactions and, during the emulation of the design block, generates the access transactions.

13. The program storage medium of claim 10, wherein the execution of the instructions by the at least one processor causes the at least one processor to implement the software co-simulation platform that compiles reconfiguration data from a specification of the design block in a hardware description language, and the control block implemented by the configuration data in the programmable logic and interconnect resources reconfigures the programmable logic and interconnect resources to implement the emulation of the design block in response to the reconfiguration data included in the reconfiguration transactions.

14. The program storage medium of claim 10, wherein each reconfiguration transaction is either a write transaction or a read transaction to one of the reconfiguration addresses in the memory map, and each access transaction is either the write transaction or the read transaction to one of the access addresses in the memory map.

15. The program storage medium of claim 10, wherein the control block implemented by the configuration data in the programmable logic and interconnect resources reconfigures the programmable logic and interconnect resources in response to the reconfiguration transactions to implement the emulation of the design block coupled to a respective input register for each of the input ports of the design block and a respective output register for each of the output ports of the design block.

16. The program storage medium of claim 15, wherein the control block implemented by the configuration data in the programmable logic and interconnect resources, in response to the access transactions, controls the emulation of the design block including the supplying of the time sequence of values from the access addresses in the memory map to the emulation of the design block via the input registers and the internal configuration block and transferring another time sequence of values from the emulation of the design block to the access addresses in the memory map via the output registers and the internal configuration block.

17. The program storage medium of claim 16, wherein the control block implemented by the configuration data in the programmable logic and interconnect resources reconfigures the programmable logic and interconnect resources in response to the reconfiguration transactions to implement the emulation of the design block that generates the another time sequence of values of the output ports from the time sequence of values of the input ports.

18. The program storage medium of claim 16, wherein the control block implemented by the configuration data in the programmable logic and interconnect resources, in response to the access transactions, controls the emulation of the design block including inhibiting a clock of the design block during the supplying of the time sequence of values to the emulation of the design block and the transferring of the another time sequence of values from the emulation of the design block.

19. The program storage medium of claim 18, wherein the communication block implemented by the configuration data in the programmable logic and interconnect resources receives from the software co-simulation platform the access transactions, which include a write transaction for the supplying of the time sequence of values to the emulation of the design block, a read transaction for the transferring of the another time sequence of values from the of the design block, and another write transaction for the inhibiting of the clock of the design block during the supplying and the transferring.

20. A method for co-simulation of an electronic system, comprising:

configuring a plurality of programmable logic and interconnect resources of a programmable device to implement a communication block and a control block, the programmable device having an internal configuration block and an array of the programmable logic and interconnect resources, the communication block for receiving a plurality of reconfiguration transactions and a plurality of access transactions from a software co-simulation platform;

generating the reconfiguration transactions by the software co-simulation platform;

reconfiguring the programmable logic and interconnect resources via the internal configuration block by the control block to implement an emulation of a design block of the electronic system in response to the reconfiguration transactions;

producing a first time sequence of values of a plurality of input ports of the design block of the electronic system by the software co-simulation platform;

consuming a second time sequence of values of a plurality of output ports of the design block by the software co-simulation platform, wherein the emulation of the design block generates the second time sequence of values of the output ports from the first time sequence of values of the input ports;

generating the access transactions for transferring the first and second sequences of values by the software co-simulation platform; and transmitting by the control block via the internal configuration block in response to the access transactions, the first sequence of values to the emulation of the design block via the internal configuration block and receiving by the control block via the internal configuration block, the second sequence of values from the emulation of the design block.

* * * * *